March 12, 1929.   J. H. CONKLIN   1,704,880
TOY SPEAKING PHONE
Filed Oct. 15, 1924   2 Sheets-Sheet 1
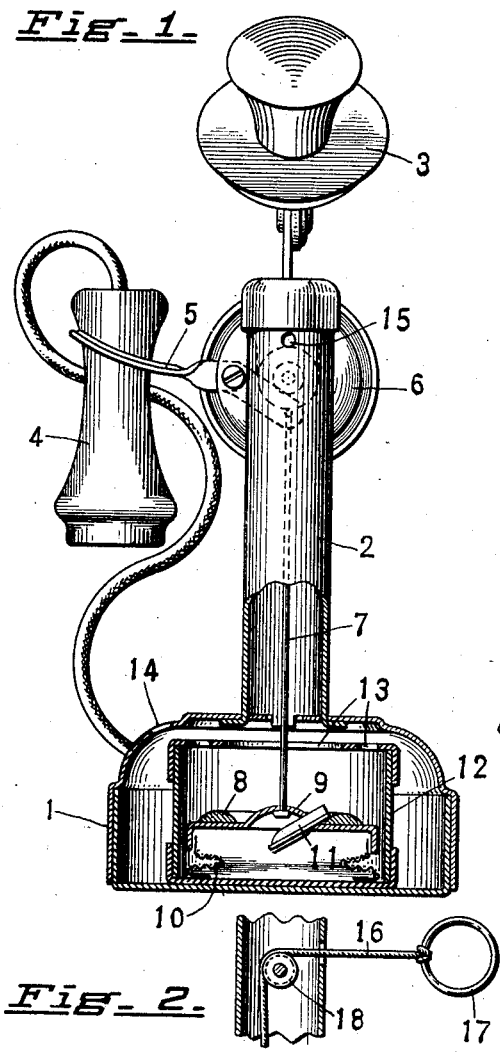
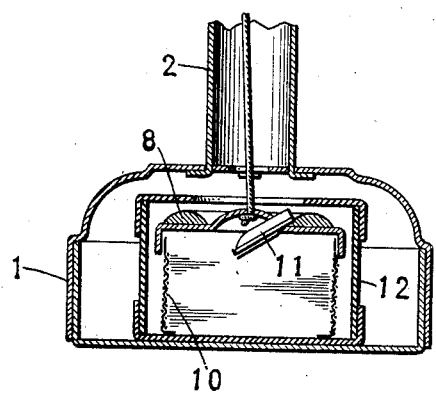
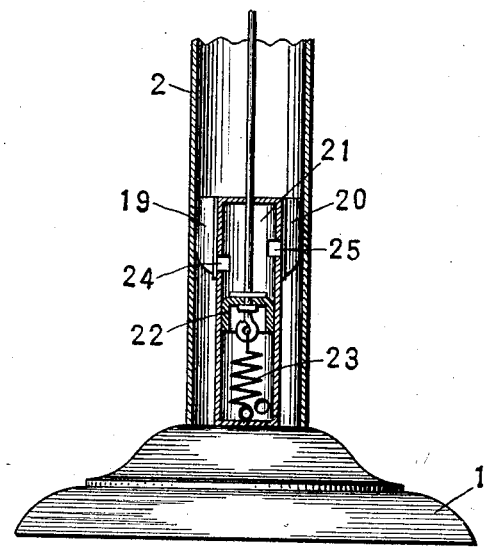
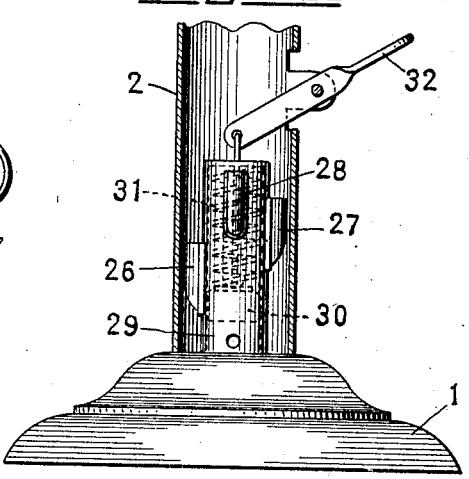
INVENTOR
John Howell Conklin,
BY
ATTORNEY

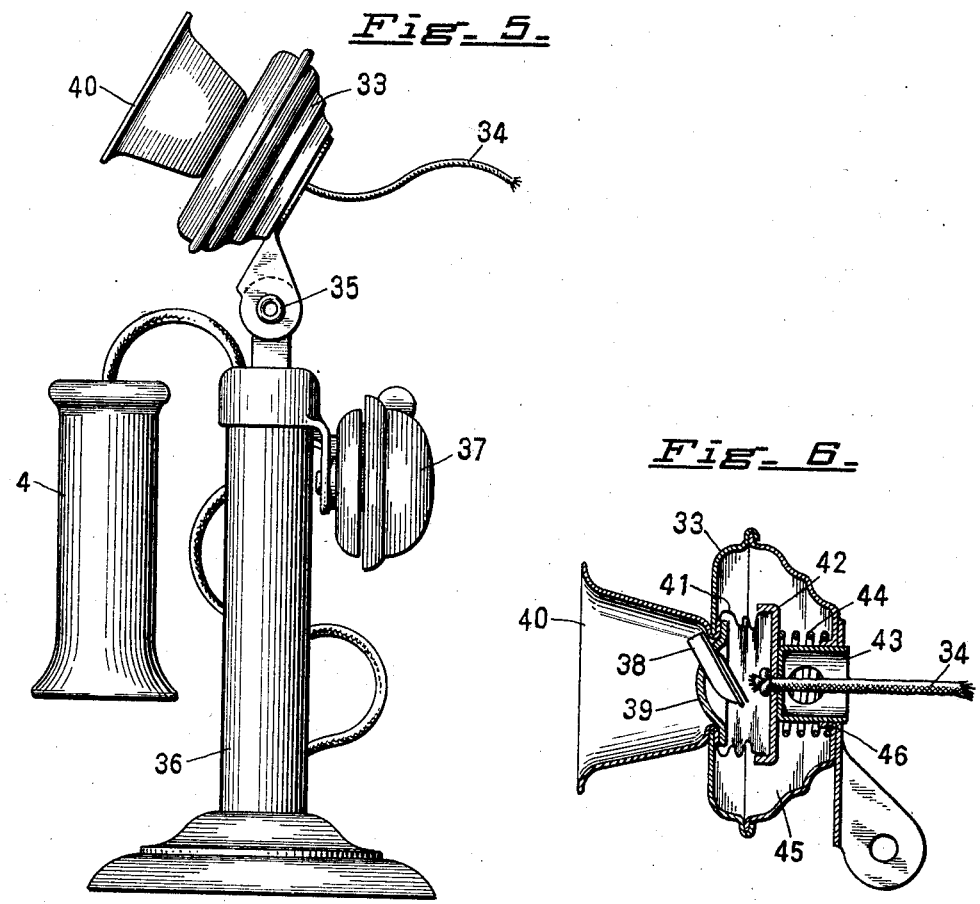

Patented Mar. 12, 1929.

1,704,880

UNITED STATES PATENT OFFICE.

JOHN HOWELL CONKLIN, OF EAST HAMPTON, CONNECTICUT, ASSIGNOR TO GONG BELL MANUFACTURING COMPANY, OF EAST HAMPTON, CONNECTICUT, A CORPORATION OF CONNECTICUT.

TOY SPEAKING PHONE.

Application filed October 15, 1924. Serial No. 743,677.

This invention relates to toys, and more especially to a toy telephone, radio phone, or similar apparatus, and in particular, is directed to telephone toy receivers and transmitters.

As it has certain features of reproducing or emitting sounds in simulation or reproduction of a voice, it has been entitled a "toy speaking phone."

Toy telephones are not essentially new in the art, and have been developed to provide for a signaling bell or gong, which gives an audible signal upon a movement of some part of the apparatus, such as the receiver hook or the dial (when the dial type of phone is employed).

The present invention has incorporated, an element which may be used in conjunction with a ringing signal, such as heretofore employed, or may be used without the audible or ringing signals and may be actuated by a moving element of the telephone such as the transmitter or dial, or by an independent element. In any case, the apparatus hereinafter described will produce sounds or tones simulating a human voice or, of course, may be so adapted as to reproduce voice sounds.

The main object of the invention which provides, in conjunction with the toy telephone set, a speaking element which, either by movement of the toy itself, or a moving element thereof, or any extraneous connection thereto, will emit sounds simulating or reproducing voice sounds.

Referring to the drawings:

Figure 1, is a view in elevation of the toy phone broken in section to illustrate the parts.

Figure 2, is a fragmentary view of the base and standard illustrated in Figure 1, showing an operating connection independent of the usual elements of a toy telephone.

Figure 3, illustrates in fragmentary section, a modified arrangement of the speaker with a connection for operating the same from the receiver hook.

Figure 4, is a view similar to Figure 3, illustrating the speaker as operated by an independent lever.

Figure 5, is a modified view in elevation illustrating the speaker or voice reproducer in the transmitter.

Figure 6, is a sectional view through the transmitter.

Figure 7, illustrates the application of a speaking mechanism similar to that of Figures 3 and 4, arranged in the receiver.

The several views of the drawings, as above described, illustrate the various locations possible for the speaker or reproducer and, as shown in the drawings, depict a simple type of mechanism employing reeds which may be so arranged and tuned, as to emit sounds simulating the voice. Thus, by proper grouping, these may even be made to simulate word sounds such as "hello", "number please", "what number" or in fact, any desired grouping of sounds.

In place of these, of course, it is possible to use any type of sound reproducing device or devices for producing or reproducing word sounds. In fact, it is quite possible to utilize phonographic reproductions by moving a small record, or section thereof, across the reproducing needle. The movement of the record or needle can readily be secured by movement of the movable element of the telephone such as the receiver or the dial or it may be moved through some independent connection such as a pull cord or lever.

Referring to the drawings, 1, indicates a base, 2, a standard, 3, a transmitter, and 4, a receiver.

As illustrated in Figure 1, the receiver is mounted upon a receiver hook 5, which is in the form of a lever, connected with a bell mechanism of a bell 6, (the bell mechanism not being shown in detail). The lever 5, at its inner end, is connected through a suitable wire or cord 7, with the movable member 8, of an air piston, illustrated in Figures 1 and 2. This air piston comprises a weighted cover 9, connected with a collapsible bellows 10, in a suitable manner.

Suitably arranged in the air piston, or adjacent thereto, is a reed, or similar air actuated "speaking" device 11.

This mechanism, as illustrated in Figures 1 and 2, is conveniently arranged in a casing 12, having apertures 13, to give free access and ingress of air, as well as a free passage of sounds.

The base or the standard may be suitably perforated as at 14, 15, so that sounds produced within the base are clearly transmitted to the exterior of the toy.

In Figure 2, a pull cord 16, with a finger ring 17, passing over a suitable guide 18, is connected with the movable element 8, of the air piston, so that the speaker 11, may be actuated independently of the movement of the receiver hook and independently of the ringing signal, however the latter may be actuated.

In Figures 3 and 4, a speaker of multiple type is illustrated, in which a series of reeds 19, 20, are connected with an air cylinder 21. These speakers 19, 20, are actuated by movement of a piston 22, which is held at one limit of its play, by a spring 23.

The arrangements of the piston and multiple speakers 19, 20, simulates word sounds such as "hello" and the word sounds may be varied according to the number and type of speaker elements employed. The piston passes over the connections 24, 25, of the speakers, and they are alternately cut off by the piston 22, so that various combinations and sounds may be produced.

In Figure 4, three or more speaker elements, 26, 27, 28, are arranged in a cylinder 29, while a piston 30 forces the air through the various speakers and cuts them off one after the other.

The piston 30, is pulled against a compression spring 31, by a lever 32.

It will be obvious that a child may manipulate such a device, as heretofore described, in various manners by increasing or diminishing the speed of movement of the air compressing element so that a great variety and character of sound changes may be secured. This, of course, makes the toy more attractive to the child as it can modify the action of the sound producing speakers.

In Figures 3 and 4, the speaking mechanism is entirely arranged within the hollow upright standard of the toy, in contradistinction to being arranged in the base of the telephone, as illustrated in Figures 1 and 2.

In Figures 5 and 6, there are the same general elements, as illustrated in Figure 1, although the speaking sound mechanism is arranged in the transmitter 33 and is operated by a connection 34.

This connection, as illustrated, is of a character which may be actuated by a pull thereon or, of course, it may be attached to some stationary part of the telephone and a movement of the transmitter, backward and forward on its pivot, 35, will serve to operate the speaker mechanism.

The receiver hook of Figure 5, is not illustrated, it being in back of the standard 36. 37, illustrates a bell for giving a ringing sound in addition to the speaker sounds, and of course, the connecting element 34, may be made fast to the receiver hook so that a movement thereof will operate the speaker and the bell at the same time, or as heretofore explained, the connection 34, may be operated by hand independently of the ringing of the bell 37.

In fact, various combinations are contemplated as to the simultaneous or independent operation of the bell signal and the speaker and are quite obvious from description, without specific detailed showing of the connections.

The speaker mechanism of Figures 5 and 6, is substantially the same as to elemental form as that of Figures 1 and 2. There is a speaker 38, secured in a suitable head 39, and extending into the transmitter mouthpiece 40. Secured to the head 39, is a collapsible element 41, which in turn is secured to the movable member 42, of the air piston.

To the back of the member 42, is secured a guide tube 43, surrounded by spring 44, which forces the member 42, forward to collapse the bellows 41, and force air through the speaker 38. A connecting cord or wire 34, serves to expand the bellows against the spring 44, when a pull is placed thereon. The guide tube slides in a casing 45, of the transmitter, which may be conveniently drawn up as at 46, to provide a substantial bearing for the guide tube 43.

In all of the several mechanisms herein described, employing speakers actuated by compressed air, the speakers are sounded by the air pistons, of collapsible elements, which compress the air, driving it through the speakers, which permit air to be drawn back upon a reverse movement of the piston or an expansion of the bellows.

In lieu of arranging the speaking element within the base or standard or transmitter of the telephone set, it may very conveniently be placed in the receiver as illustrated in Figure 7.

The receiver 4, of Figure 7, is bored as at 47, counter bored as at 48, to receive a cylinder 49, to which are attached the speakers 50, 51, each speaker having a suitable duct or opening 52, 53, connecting the speaker with the interior of the cylinder 49. Within the cylinder is arranged a piston 54, which has ports 55, 56, for the respective speaker ducts 52, 53, and the piston is held to one limit of its play by a spring 57.

A pull rod 58, connected with the head of the piston 54, and with the spring 57, extends through the end 59, of the cylinder and is exteriorly connected to the receiver wire or cord 60. This cord ordinarily at its other end is made fast to the base of the phone in simulation of a regular type of "desk phone" and it will be obvious that a pull upon the receiver when held to the ear, will cause the piston 54, to compress air in the cylinder 49, and actuate the speakers 50, 51.

The ports 55, 56, are so arranged relatively to the ducts 52, 53, that the latter are alternately connected and disconnected with the source of compressed air, therefore, the speakers will be actuated independently of each other and with a slight pause between the speaking of each of the elements. In this manner, word sounds may be produced.

In the form of device illustrated in Figure 7, the entire speaker mechanism may be made up as a unit and placed in the bore of the receiver and suitably secured therein as by a pin 61, or other fastening device.

It may further be protected from the child by a perforated spring disc 62, which snaps into an annular groove 63.

The operation of the mechanism will be quite apparent, and in its operation, a child has considerable latitude for testing its skill introducing various sounds. The bell or other sound producing mechanism for ringing a signal will be first actuated and by then manipulating the speaker mechanism the word sounds may be produced, thus giving a very novel combination for holding the interest of the child.

What I claim as my invention and desire to secure by Letters Patent is:

1. In a toy telephone, a supporting structure composed of a base and a standard mounted on the base, a receiver arm pivoted on the standard, sound producing means comprising compressible pneumatic means mounted within said supporting structure, and a connection between said pneumatic means and the receiver arm whereby movement of said arm actuates the pneumatic means.

2. In a device of the class described, in combination, a hollow base member having sound transmitting perforations therein, a hollow standard rising from said base, a toy transmitter mounted upon said standard to simulate a telephone instrument, a receiver hook projecting within said standard and pivoted to the walls thereof, a voicing apparatus housed in said base comprising relatively movable members and a bellows secured to said movable member and said base, means whereby movement of said movable member may cause enunciating sounds, means connecting said receiver hook with said movable member whereby movement of the hook in one direction may cause the expansion of said bellows.

3. In a device of the class described, in combination, a hollow base member, a sounding apparatus housed in said base member having relatively movable operative elements, means whereby relative movement of said elements in one direction only causes sound, a hollow standard rising from said base, a lever pivoted to the standard having one end projecting thereinto and the other end projecting outwardly therefrom, means connecting one of said movable elements with the inwardly projecting end of said lever, means to normally return said lever to the limit of relative movement of said elements in one direction whereby when said lever is moved in one direction only, said sounding apparatus will be caused to emit a sound, a toy transmitter mounted upon the extremity of said hollow standard, a toy receiver, and a cord connecting said toy receiver to said base.

4. In a device of the class described, in combination, a hollow base member, a hollow standard rising from said base, a toy transmitter mounted upon said standard to simulate a telephone instrument, a receiver hook projecting within said standard and pivoted to the walls thereof, a voicing apparatus housed in said base comprising relatively movable members, a bellows secured to said movable member and said base, means whereby movement of said movable member may cause enunciating sounds, means connecting said receiver hook with said movable member whereby movement of the hook in one direction may cause the expansion of said bellows.

5. In combination with a toy telephone set comprising a supporting structure composed of a base and a standard mounted on the base, a dummy transmitter and a dummy receiver, one of which dummy elements is movable, a plurality of sound producing devices including a compressible pneumatic means mounted within the supporting structure and a connection between said pneumatic means and the movable element of the telephone set whereby movement thereof actuates the pneumatic means.

JOHN HOWELL CONKLIN.